United States Patent
Koyanagi

(10) Patent No.: US 7,155,580 B2
(45) Date of Patent: Dec. 26, 2006

(54) INFORMATION PROCESSING APPARATUS AND METHOD OF CONTROLLING MEMORY THEREOF

(75) Inventor: Hisao Koyanagi, Minato-ku (JP)

(73) Assignee: NEC Corporation, Tokyo (JP)

( * ) Notice: Subject to any disclaimer, the term of this patent is extended or adjusted under 35 U.S.C. 154(b) by 293 days.

(21) Appl. No.: 10/623,660

(22) Filed: Jul. 22, 2003

(65) Prior Publication Data

US 2004/0128472 A1 Jul. 1, 2004

(30) Foreign Application Priority Data

Jul. 25, 2002 (JP) ............................. 2002-216607

(51) Int. Cl.
*G06F 12/00* (2006.01)
(52) U.S. Cl. ..................................... 711/154
(58) Field of Classification Search ..................... None
See application file for complete search history.

(56) References Cited

U.S. PATENT DOCUMENTS

| 4,680,730 | A  | * | 7/1987  | Omoda et al. ............ | 711/169 |
| 5,241,633 | A  | * | 8/1993  | Nishi ....................... | 712/216 |
| 6,240,524 | B1 | * | 5/2001  | Suzuki ..................... | 713/500 |
| 6,629,271 | B1 | * | 9/2003  | Lee et al. ................. | 714/49  |
| 6,862,676 | B1 | * | 3/2005  | Knapp et al. ............. | 712/217 |

FOREIGN PATENT DOCUMENTS

| JP | 4-112328 A    | 4/1992  |
| JP | H05-020350 A  | 1/1993  |
| JP | H07-073095 A  | 3/1995  |
| JP | H10-334081 A  | 12/1998 |
| JP | 2000-267927 A | 9/2000  |
| JP | 2001-195301 A | 7/2001  |
| JP | 2002-024205   | 1/2002  |
| JP | 2002-024205 A | 1/2002  |

* cited by examiner

*Primary Examiner*—Mano Padmanabhan
*Assistant Examiner*—Duc T Doan
(74) *Attorney, Agent, or Firm*—Sughrue Mion, PLLC

(57) ABSTRACT

A vector information processing apparatus has a CPU comprising a plurality of asynchronously operating units, a main memory for storing data, and a main memory controller for controlling the writing of data in the main memory. The main memory controller has a VSC address buffer for holding a storage address in the main memory for each element designated by a vector scatter instruction. The main memory controller is arranged to inhibit the outputting of a writing permission signal for the main memory which is generated according to a writing request for writing an element having a smaller element number, which has the same storage address as the storage address and which has not been processed in a sequence of element numbers, of writing requests for writing elements in the main memory which are issued respectively from the asynchronously operating units according to a vector scatter instruction.

20 Claims, 8 Drawing Sheets

VSC INSTRUCTION

| OPC | X | Y | Z |

$M(V_y(0), V_y(1), ...., V_y(VL-1)) \leftarrow V_z$

INFORMATION PROCESSING APPARATUS AND METHOD OF CONTROLLING MEMORY THEREOF

BACKGROUND OF THE INVENTION

1. Field of the Invention

The present invention relates to an information processing apparatus, and more particularly to a vector information processing apparatus for parallel processing of information on a hardware basis.

2. Description of the Related Art

Information processing apparatus in recent years suffer greater signal delays caused by transmission lines as the operating frequency thereof goes higher. In such information processing apparatus, it is very difficult to operate a plurality of semiconductor integrated circuits (CPUs, LSI circuits, etc.) with clock signals that are kept in phase with each other.

One solution to the above problem is proposed as a method of synchronizing, on a software basis, the processes carried out by a plurality of CPUs that operate with asynchronous clock signals. For example, there is known a method of dispatching a plurality of designated processes to CPUs that operate under different OSs (Operating Systems) using a hardware function referred to as a barrier synchronization/communication register. Since this method is based on the premise that the plural processes operate at entirely different timings, operation failures on account of the hardware function do not occur even if the clock signals of the respective CPUs are out of synchronism with each other. The method has been implemented in products called a scalar parallel computer, for example.

The above method, which synchronizes a plurality of processes on a software basis, has an increased apparent performance vs. cost ratio because it can be achieved much more inexpensively than attempts to improve hardware performance such as CPU operating speeds and data transfer speeds between CPUs and memories.

However, the above method is problematic in that it is highly difficult to parallelize programs. The difficulty arises from the fact that instructions used in programs have a wide variety of different limitations on parallelization. Even if programs can be parallelized, a process of debugging them is much more difficult to perform than programs that are not parallelized. The debugging process is generally carried out when performance tuning is effected on the information processing apparatus, and requires a high level of skill about the parallel processing technology. Inasmuch as the difficult debugging process needs to be carried out each time hardware improvements are introduced, vast program resources are made useless. Even if technical goals for parallelizing programs are accomplished, another problem is encountered in that sufficient human resources are not available for operating the programs at site.

The above problems may be solved by the parallel processing of information on a hardware basis. One specific example of such a solution is known as a vector information processing apparatus.

A vector process is a process (Single Instruction Multiple Data stream: SIMD) for simultaneously processing a plurality of regularly arranged data. A register which stores such a plurality of regularly arranged data is referred to as a vector register, and instructions for performing the same operation on, effecting memory access to, and transferring, all the elements stored in the vector register are referred to as vector instructions.

A vector instruction is described, for example, as:

LVL VL<-128
VADD V7<-V5+V4

In this example, elements (128 elements) to be processed are stored in a VL (vector length register) using an LVL (Load VL) instruction, after which elements (128 elements) in vector registers V5, V4 are added using a VADD (vector addition) instruction, and the resultant sum is stored in a vector register V7.

According to the vector process, since software-based synchronization between processes is not required, software can be generated on the same idea as with a single CPU. The vector process has actually been used effectively as a parallelizing process, and a compiler for parallelization already exists.

For improving performance with the vector process, however, a bandwidth (data transfer speed) commensurate with the performance to be improved needs to be kept between a CPU and a memory. If the CPU comprises a plurality of vector units for executing vector instructions and the vector units are operated parallel to each other, then processing operations can be performed at a higher speed.

The vector information processing apparatus which has a CPU comprising a plurality of vector units suffers problems to be described below when a VSC (vector scatter) instruction is executed.

The VSC instruction is a very important instruction in the vector information processing apparatus. Specifications of the VSC instruction will be described below with reference to FIG. 1 of the accompanying drawings.

As shown in FIG. 1, the VSC instruction is an instruction which uses elements in a vector register Vy designated by a Y field and stores elements in a vector register Vz designated by a corresponding Z field in a memory. In FIG. 1, an OPC field is an operation code indicative of a VSC code, and an X field is an invalid area which is not used.

In a process according to a VSC instruction, elements are successively written into a memory in the sequence of element numbers. For storing a plurality of elements at the same address, in particular, priority has to be given to the writing of an element having a larger element number. For example, when an element n and an element n+1 are to be stored at the same memory address, it is necessary to give priority to the writing of the element n+1 and invalidate the element n. If the process is carried out by a single unit or a plurality of units that operate in synchronism with each other as is conventional, the above limitation is not required to be taken into account since writing requests are issued in the sequence of element numbers from one port.

In the vector information processing apparatus where the CPU comprises a plurality of asynchronously operating units, since the sequence of processing based on element writing requests (hereinafter referred to as element requests) issued from the units is not guaranteed, the sequence of writing requests in the memory may be reversed.

For example, as shown in FIG. 2 of the accompanying drawings, a CPU comprises a master unit and a slave unit which are asynchronously operating units and element requests of adjacent element numbers (an element n and an element n+1) are distributed to and issued from the master and slave units. If the element requests are requests for storing the element n and the element n+1 at the same memory address, then a memory controller for controlling the writing of elements in the memory may possibly process the element n+1 prior to the element n. If the element n+1 is written prior to the element n, then the element n is written to overwrite the element n+1.

The above problem may be solved by synchronizing element requests issued from a plurality of asynchronously operating units. This solution, however, requires increased overhead for synchronizing element requests, and results in increased intervals at which the element requests are issued. These drawbacks cancel out the advantages provided by a high-speed processing apparatus based on parallel operation of the master and slave units.

SUMMARY OF THE INVENTION

It is an object of the present invention to provide an information processing apparatus which has a CPU comprising a plurality of asynchronously operating units and is capable of eliminating adverse effects caused when a processing sequence of element requests from the units is reversed, and a method of controlling a memory of such an information processing apparatus.

To achieve the above object, a vector information processing apparatus according to the present invention has a CPU comprising a plurality of asynchronously operating units, a main memory for storing data, and a main memory controller for controlling the writing of data in the main memory, the main memory controller having a VSC address buffer for holding a storage address in the main memory for each element designated by a vector scatter instruction, for inhibiting the outputting of a writing permission signal for the main memory which is generated according to a writing request for writing an element having a smaller element number, which has the same storage address and which has not been processed in a sequence of element numbers, of writing requests for writing elements in the main memory which are issued respectively from the asynchronously operating units according to a vector scatter instruction.

With the above arrangement, the CPU may comprise a plurality of asynchronously operating units because adverse effects caused when a processing sequence among a plurality of asynchronously operating units is reversed are eliminated. It is thus possible to reduce the circuit scale of each unit, and the yield of the units (LSI circuits) is increased and the number of external terminals thereof is reduced, resulting in a reduction in the cost of the information processing apparatus.

In the information processing apparatus, the main memory controller comprises a VSC address buffer controller for controlling the VSC address buffer to hold the storage address sent from the asynchronously operating units and, if the VSC address buffer suffers an overflow, requests the asynchronously operating unit which has issued a vector scatter instruction that has caused the overflow to resend the element, and the asynchronously operating unit has a retry buffer for holding each element designated by the vector scatter instruction issued thereby, and resends an element held by the retry buffer to the main memory controller if requested by the main memory controller to resend the element.

With the above arrangement, since the VSC address buffer can be used efficiently, the scale of the VSC address buffer can be reduced, and the cost of the main memory can be lowered.

The above and other objects, features, and advantages of the present invention will become apparent from the following description with reference to the accompanying drawings which illustrate examples of the present invention.

DETAILED DESCRIPTION OF THE PREFERRED EMBODIMENTS

1st Embodiment

Figures 1, 2:
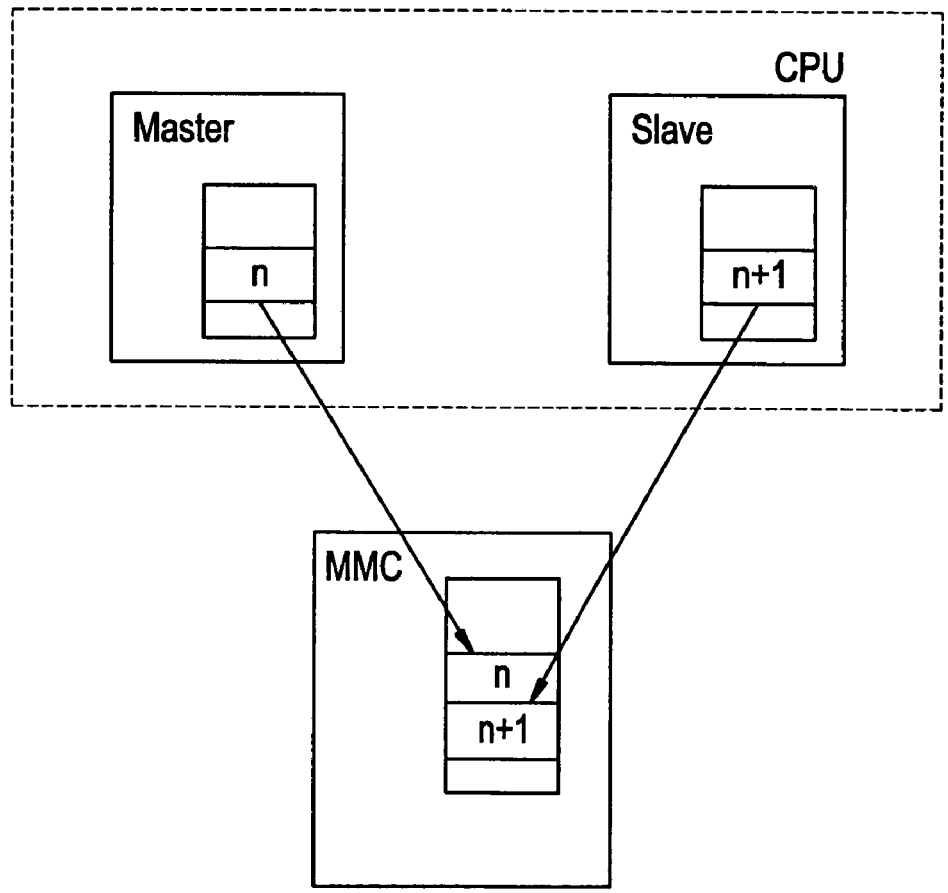
FIG. 1 is a diagram showing the specifications of a VSC instruction which is used by a vector computer.
FIG. 2 is a diagram showing the manner in which a CPU comprises a master unit and a slave unit and elements are stored in a main memory unit by a VSC instruction.
Figure 3:
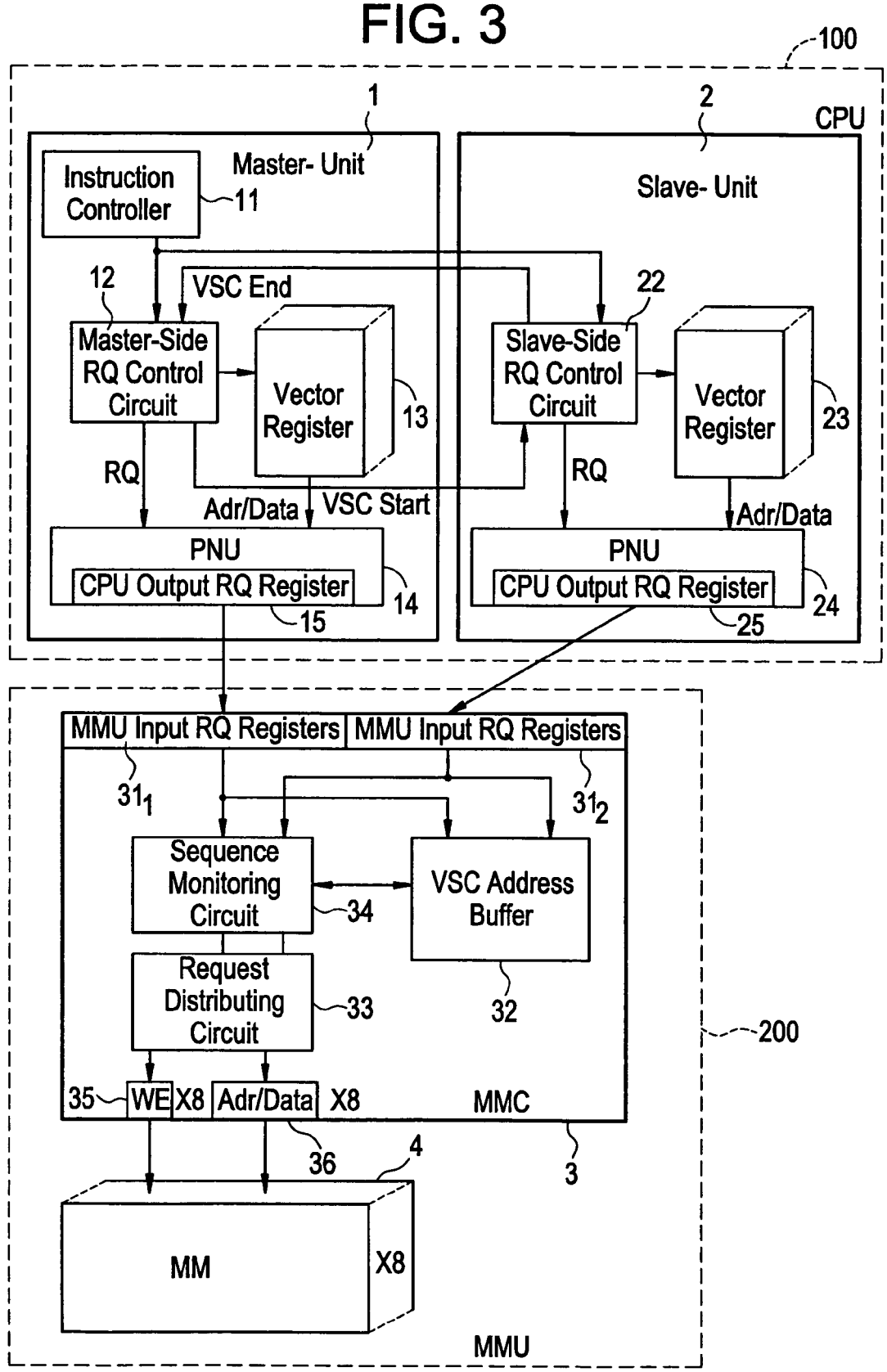
FIG. 3 is a block diagram of an information processing apparatus according to a first embodiment of the present invention.
Figure 4:
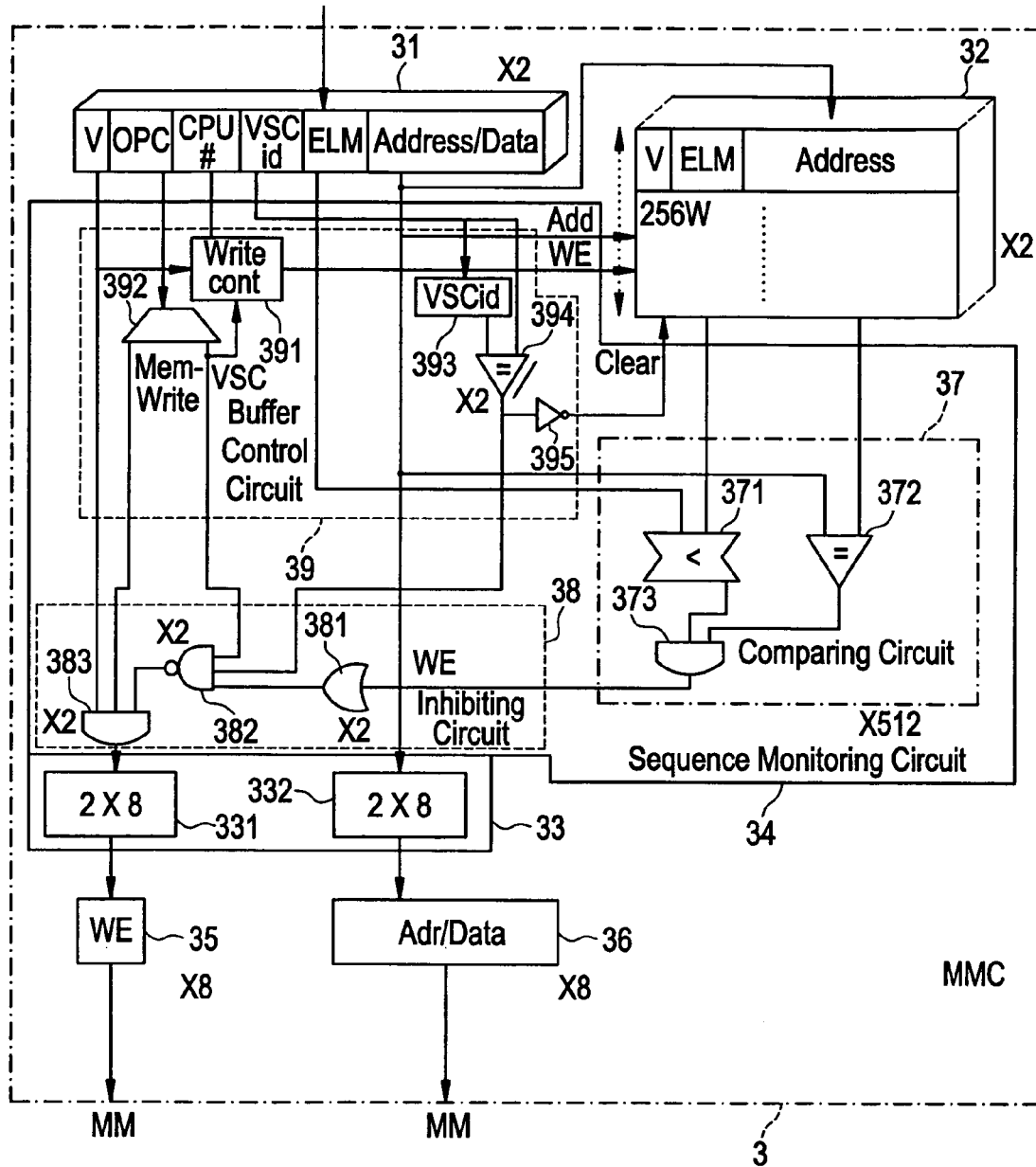
FIG. 4 is a block diagram of a main memory controller in the information processing apparatus shown in FIG. 3.

FIG. 3 shows in block diagram an information processing apparatus according to a first embodiment of the present invention, and FIG. 4 shows in block diagram a main memory controller in the information processing apparatus shown in FIG. 3.

As shown in FIG. 3, the information processing apparatus according to the first embodiment generally comprises CPU (Central Processing Unit) 100 and MMU (Main Memory Unit) 200.

CPU 100 has two asynchronously operating units, i.e., master unit 1 and slave unit 2. Basically, master unit 1 and slave unit 2 carry out the same processing according to vector instructions except that master unit 1 manages issuance/ending of vector instructions. These vector units are usually in the form of two different LSI circuits, but may be incorporated in a single LSI circuit insofar as they operate asynchronously.

In FIG. 3, CPU 100 is shown as comprising single master unit 1 and single slave unit 2. However, CPU 100 may comprise single master unit 1 and a plurality of slave units 2, or may comprise a plurality of sets each having single master unit 1 and at least single slave unit 2.

Master unit 1 and slave unit 2 shown in FIG. 3 are arranged to process 256 elements simultaneously according to VSC instructions. It is assumed that master unit 1 processes even-numbered elements and slave unit 2 processes odd-numbered elements.

Master unit 1 has instruction controller 11, master-side RQ control circuit 12, vector register 13, and PNU 14. Slave unit 2 has slave-side RQ control circuit 22, vector register 23, and PNU 24.

Instruction controller 11 supplies master-side RQ control circuit 12 and slave-side RQ control circuit 22 with corresponding operation codes when a vector instruction is issued.

In response to the operation code of the VSC instruction, master-side RQ control circuit 12 checks all conditions for executing the VSC instruction, and sends a VSCstart signal for starting a processing at a predetermined timing to slave-side RQ control circuit 22. Master-side RQ control circuit 12 issues element requests of even-numbered requests, and sends request information including an element number, unit number CPU#, identifier VSCid, etc., together with a storage address and data to be stored in a memory which are designated by the VSC instruction and read from vector register 13, to PNU 14. Unit number CPU# serves to distinguish units which have issued element requests. For example, unit number CPU# of request information sent from master unit 1 is assigned an even number, and unit number CPU# of request information sent from slave unit 2 is assigned an odd number. However, if the CPU comprises a plurality of sets of master units 1 and slave units 2, then unit numbers CPU# assigned to one set of master unit 1 and slave unit 2 are set to successive values. Identifier VSCid serves to distinguish VSC instructions, and one identifier is assigned to all element requests that are issued by a single VSC instruction.

PNU 14 holds element requests, request information, storage address and data received from master-side RQ control circuit 12, temporarily in CPU output RQ register 15, and then sends them to MMU 200.

Slave-side RQ control circuit 22 processes odd-numbered elements in the same manner as master-side RQ control circuit 12, and sends a VSCend signal, which indicates a processing end at the issuance timing of a final one of a plurality of element requests that are issued by one VSC instruction, to master-side RQ control circuit 12.

In response to the VSCend signal, master-side RQ control circuit 12 starts processing a next VSC instruction that is issued from instruction controller 11 after having waited for a final element request issued by master-side RQ control circuit 12.

Vector register 23 of slave unit 2 operates in the same manner as vector register 13 of master unit 1, and PNU 24 of slave unit 2 operates in the same manner as PNU 14 of master unit 1.

MMU 200 has MM (Main Memory) 4 for storing data and MMC (Main Memory Controller) 3 for controlling the writing of data into MM 4. In FIG. 3, the information processing apparatus is shown as having single MMU 200. However, the information processing apparatus is not limited to single MMU 200, but may have a plurality of MMUs 200.

MM 4 comprises a plurality of (eight in FIG. 3) memory units which are called banks that can be accessed parallel to each other. Each of the banks stores data in an interleaved pattern at designated addresses.

MMC 3 comprises MMU input RQ registers $31_1$, $31_2$, VSC address buffer 32, request distributing circuit 33, sequence monitoring circuit 34, WE register 35, and adr/data register 36.

MMU input RQ registers $31_1$, $32_2$ are registers for receiving request information, storage addresses and data sent from master unit 1 and slave unit 2, and are associated with master unit 1 and slave unit 2, respectively.

VSC address buffer 32 is a register for temporarily storing storage addresses for storing elements in MM 4. Each of master unit 1 and slave unit 2 shown in FIG. 3 has two registers for holding addresses of 256 W (words) in order to simultaneously process 256 elements. In the present embodiment, VSC address buffer 32 holds storage only addresses corresponding to one VSC instruction, and does not store overlapping addresses which correspond to a plurality of VSC instructions.

Request distributing circuit 33 distributes a Mem-Write signal for permitting the writing of an element, and a designated storage address and data to the banks of the MM4 which correspond to the storage addresses for elements.

If element requests issued by one VSC instruction include element requests which have the same storage address and which are not processed in the sequence of element numbers, then sequence monitoring circuit 34 inhibits the outputting of a Mem-Write signal generated by an element request of a smaller request number, among those element requests.

WE register 35 holds Mem-Write signals sent from request distributing circuit 33, and sends the Mem-Write signals to the banks of MM 4 which correspond to storage addresses.

adr/data register 36 holds storage addresses and data sent from request distributing circuit 33, and sends them to the banks of MM 4 which are designated by storage addresses.

As shown in FIG. 4, the sequence monitoring circuit 34 comprises comparing circuit 37 for comparing element numbers and storage addresses of a preceding element request and a following element request with each other, WE inhibiting circuit 38 for inhibiting the outputting of a Mem-Write signal generated by an element request of a smaller request number if the sequence of processing is reversed and the storage addresses agree with each other as a result of the comparison by comparing circuit 37, and buffer control circuit 39 for controlling the writing of storage addresses into VSC address buffer 32.

Comparing circuit 37 comprises element number comparator 371 for comparing the element numbers of a preceding element request and a following element request which are stored in VSC address buffer 32 with each other thereby to detect a reversal of the sequence of processing, address comparator 372 for comparing the storage addresses of a preceding element request and a following element request which are stored in VSC address buffer 32 with each other thereby to detect an access to the same address, and AND gate 373 for outputting the result of ANDing of the compared result from element number comparator 371 and the compared result from address comparator 372. Each of element number comparator 371, address comparator 372, and AND gate 373 is provided as 256×2=512 units corresponding to the number of words (the number of entries) that can be stored in VSC address buffer 32.

If a following element request is issued from master unit 1, then address comparator 371 compares the address of the following element request and the address of a preceding element request issued from slave unit 2. If a following element request is issued from slave unit 2, then address comparator 371 compares the address of the following element request and the address of a preceding element request issued from master unit 1. This is because element requests successively issued from master unit 1 or slave unit 2 do not reverse the sequence of processing.

When the output of AND gate 373 goes active, it indicates that the sequence of processing element requests issued from master unit 1 and slave unit 2 is reversed, and a wrong writing event occurs in MM 4.

Buffer control circuit 39 comprises writing controller 391, decoding circuit 392, VSCid register 393, VSCid comparator 394, and inverter 395.

Decoding circuit 392 decodes operation codes sent from master unit 1 and slave unit 2, and generates a VSC signal indicative of a VSC instruction and a Mem-Write signal which is a signal for permitting the writing of data into MM 4.

Writing controller (write con) 391 is a logic circuit which is supplied with a valid (V) signal indicating that an element is valid, unit number CPU#, and a VSC signal, and when an element is valid, searches VSC address buffer 32 which corresponds to an issuing source of element requests, and sends a writable (empty) address and a write enable WE signal to VSC address buffer 32.

VSC address buffer 32 stores storage addresses (Address) transferred from MMU input RQ registers $31_1$, $32_2$ in association with element numbers (ELM) according to an address and a WE signal sent from writing controller 391.

VSCid register 393 holds identifier VSCid allotted to a preceding element request. VSCid comparator 394 compares identifier VSCid held by VSCid register 393 and identifier VSCid allotted to a following element request with each other. When identifier VSCid allotted to the following element request changes, i.e., when control goes to the processing of a next VSC instruction, VSCid comparator 394 sends a timing signal (Clear) in order to clear the content stored in VSC address buffer 32. The timing signal sent from VSCd comparator 394 is supplied via inverter 395 to VSC address buffer 32.

WE inhibiting circuit 38 has two OR gates 381, two first AND gates 382, and two second AND gates 383, which are as many as the number of VSC address buffers 32.

Each OR gate 381 inhibits the outputting of a Mem-Write signal for permitting the writing of an element if the output of any of the corresponding 256 AND gates 373 becomes active under the conditions that an element is valid, the VSC instruction is the same, and identifier VSCid remains unchanged based of the compared result from each AND gate 373.

Request distributing circuit 33 comprises WE 2×8 switch 331 for sending two Mem-Write signals corresponding respectively to master unit 1 and slave unit 2 to the corresponding banks of MM 4, and adr/data 2×8 switch 332 for sending storage addresses and data sent from master unit 1 and slave unit 2 to the corresponding banks of MM 4.

Operation of the information processing apparatus according to the present embodiment at the time a VSC instruction is issued will be described below with reference to FIG. 5.

Figure 5:
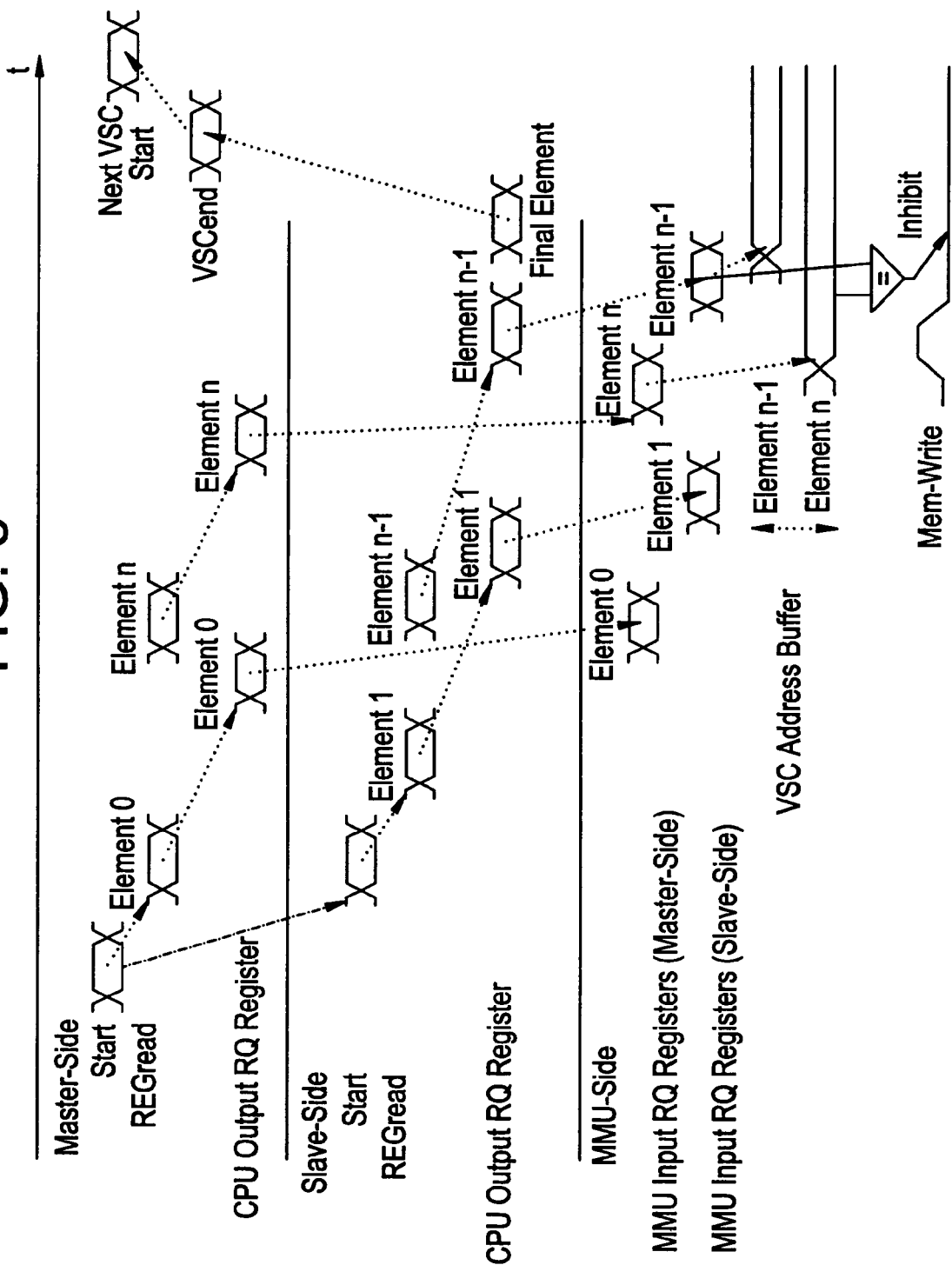
FIG. 5 is a diagram showing the manner in which the information processing apparatus shown in FIG. 3 operates under a VSC instruction.

FIG. 5 shows the manner in which the information processing apparatus shown in FIG. 3 operates under a VSC instruction. In FIG. 5, it is assumed that CPU 100 comprises single master unit 1 and single slave unit 2.

As shown in FIG. 5, when instruction controller 11 of master unit 1 issues a VSC instruction, master-side RQ control circuit 12 generates a VSCstart signal and sends the VSCstart signal to slave-side RQ control circuit 22.

Then, master-side RQ control circuit 12 and slave-side RQ control circuit 22 issue respective element requests of element numbers handled by their units, read (REG read) storage address and data designated by the VSC instruction from vector registers 13, 23, and sends the read storage address and data, and generated request information via PNUs 14, 24 to MMU 200.

It is assumed that master unit 1 issues even-numbered element requests successively from element 0 to element n, and slave unit 2 issues odd-numbered element requests successively from element 1 to element n–1.

For example, if element requests for element n–1 and element n have an instruction to store data at the same address, it is possible for MMU 200 to receive the element request for element n prior to the element request for element n–1.

In the present embodiment, the element number and storage address corresponding to the following element request for element n–1 and the element number and storage address corresponding to the preceding element request for element n are compared with each other by comparing circuit 37 of MMC 3. If it is detected that the storage address for element n is stored in VSC address 32 before the storage address for element n–1, then a Mem-Write signal generated by the element request for element n–1 is inhibited from being sent out by WE inhibiting circuit 38.

Therefore, the data of element n–1 is not written in MM 4, and hence is prevented from overwriting the data of element n.

When slave unit 2 issues a final element request, then slave-side RQ control circuit 22 sends a VSCend signal indicative of a processing end to master-side RQ control circuit 12 at the issuance timing of the final element request. In response to the VSCend signal, master-side RQ control circuit 12 starts processing a next VSC instruction that is issued from instruction controller 11 after having waited for an issuance end of a final element request of master-side RQ control circuit 12.

When MMC 200 receives an element request under a next VSC instruction, MMC 200 clears all the contents of VSC address buffer 32 which have been stored by the preceding VSC instruction. At this time, the preceding VSC instruction and the following VSC instruction are distinguished from each other using identifier VSCid.

In the present embodiment, the CPU is illustrated as comprising one set of master unit 1 and slave unit 2 for an easier understanding of the present invention. However, the CPU often comprises a plurality of sets of master units 1 and slave units 2 in actual information processing apparatus.

For example, if the CPU comprises a plurality of sets of master units 1 and slave units 2 and VSC address buffer 32 is arranged to hold storage addresses corresponding to a plurality of VSC instructions, then the processing speed of the information processing apparatus can further be increased between the intervals at which VSC instructions are issued can be shortened.

However, such an arrangement requires as many VSC address buffers 32 as (the number of sets of master units 1 and slave units 2)×2. If it is assumed that each of master units 1 and slave units 2 simultaneously processes 256 elements, then the number of entries of VSC address buffers 32, which is represented by the following equation, is required:

The number of entries=(the number of sets of master units 1 and slave units 2)×512×(the number of overlaps of VSC instructions).

If the number of sets of master units 1 and slave units 2 is increased, then the scale of the circuit required is greatly increased because components of comparing circuit 37 have to be added accordingly. Particularly, if the VSC address buffer is arranged to hold storage addresses corresponding to a plurality of VSC instructions, then a further increase in the scale of the circuit is caused due to an additional circuit increase required by a complex processing.

For the above reason, VSC address buffer 32 is preferably arranged to hold storage addresses corresponding to a single VSC instruction. The number of sets of master units 1 and slave units 2 should preferably be set to an optimum number for fulfilling performance requirements of the information processing apparatus by trading off a reduction in the performance due to increased intervals at which VSC instructions are issued and an increase in the scale of the circuit.

Similarly, if the CPU comprises single master unit 1 and a plurality of slave units 2, then VSC address buffer 32 is preferably arranged to hold storage addresses corresponding to a single VSC instruction, and the number of slave units 2 should preferably be set to an optimum number for fulfilling performance requirements of the information processing apparatus.

With the information processing apparatus according to the present embodiment, since adverse effects caused when a processing sequence of element requests issued from a plurality of units is reversed are eliminated, a wrong writing event does not occur even if the CPU comprises a plurality of asynchronously operating units. With the CPU comprising a plurality of units, it is possible to reduce the circuit scale of each unit, and the yield of the units (LSI circuits) is increased and the number of external terminals thereof is reduced, resulting in a reduction in the cost of the information processing apparatus.

2nd Embodiment

An information processing apparatus according to a second embodiment of the present invention will be described below with reference to FIGS. 6 through 9.

Figure 6:
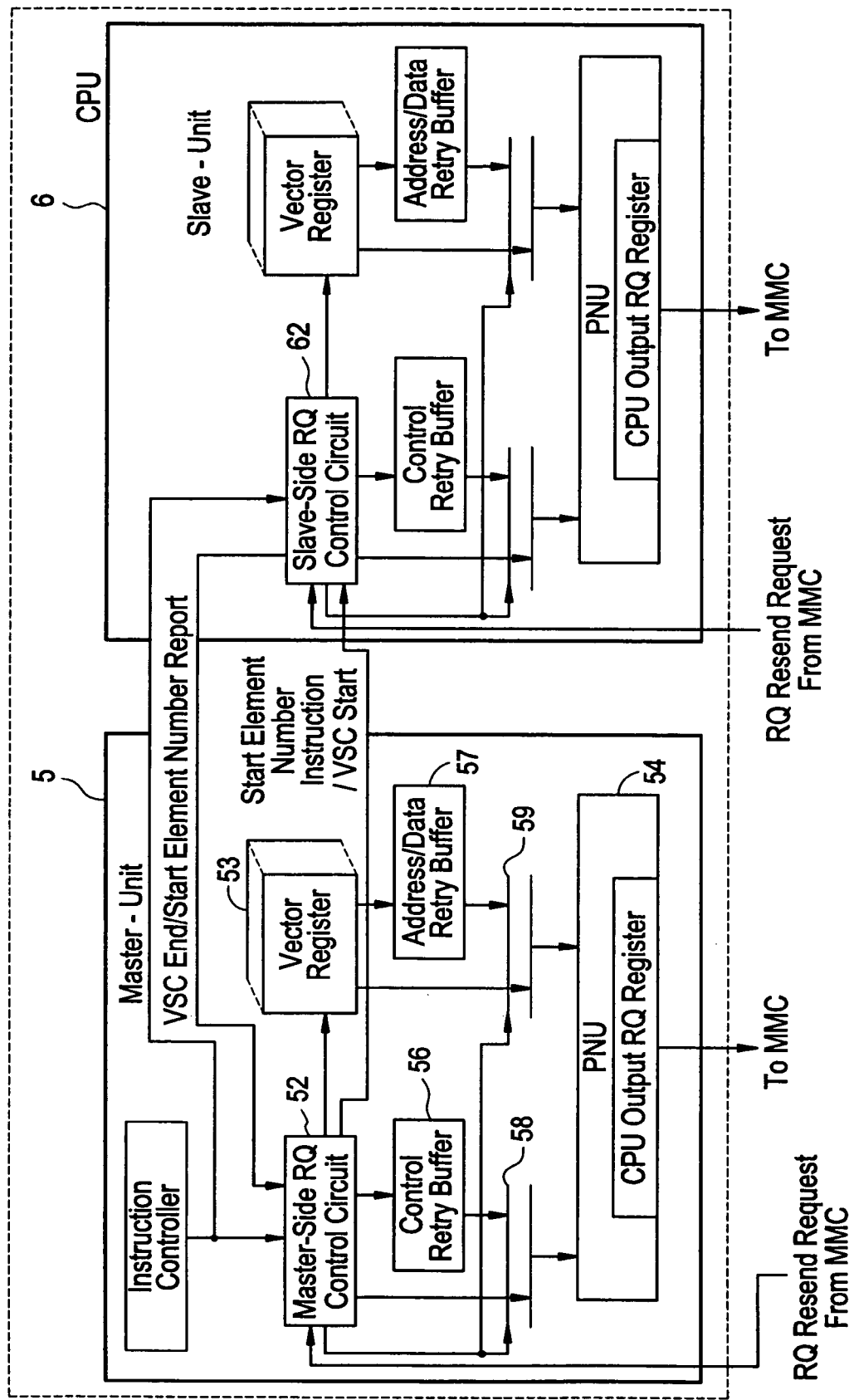
FIG. 6 is a block diagram of a CPU in an information processing apparatus according to a second embodiment of the present invention.
Figure 7:
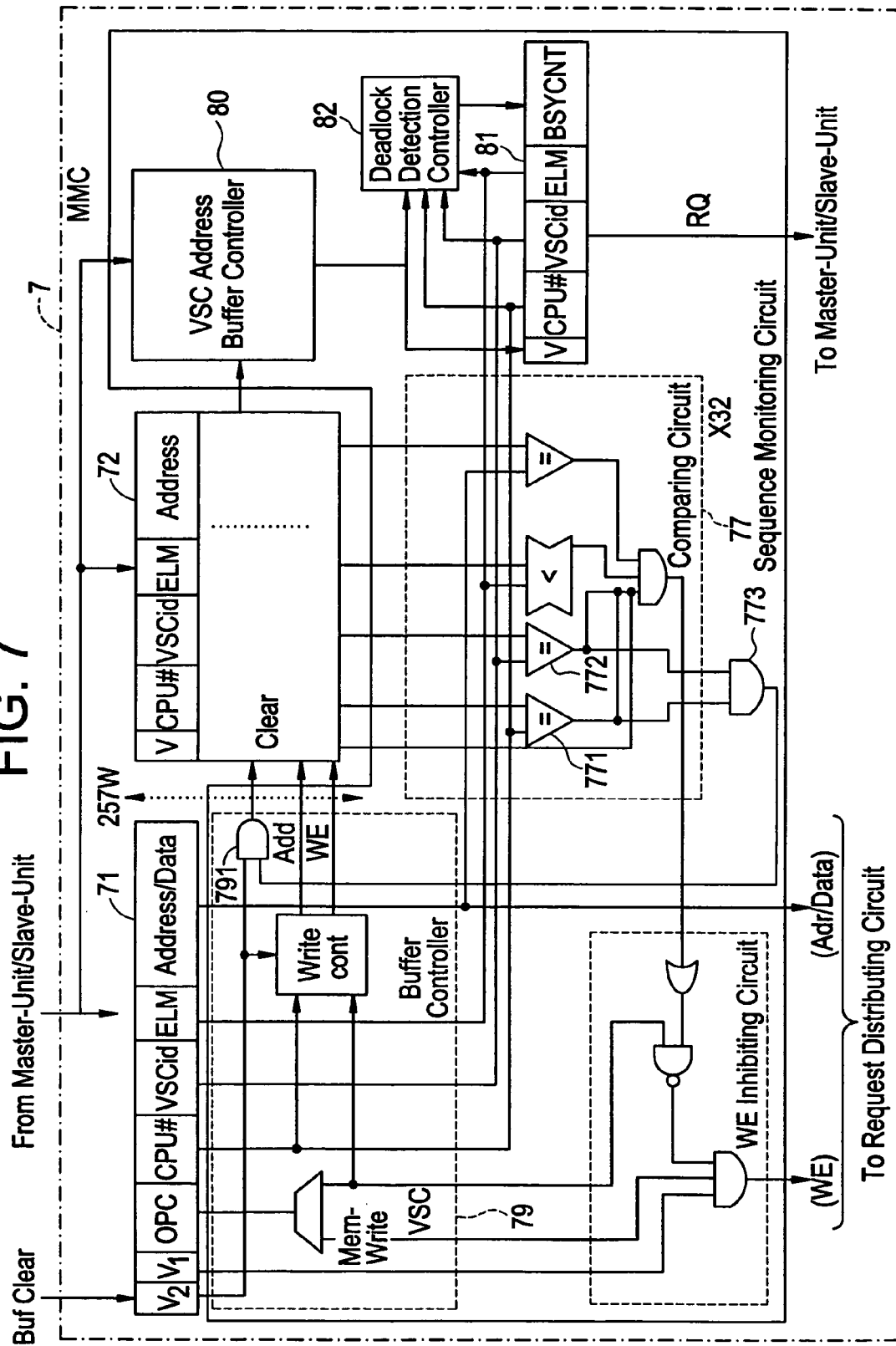
FIG. 7 is a block diagram of a main memory controller in the information processing apparatus according to the second embodiment of the present invention.
Figure 8:
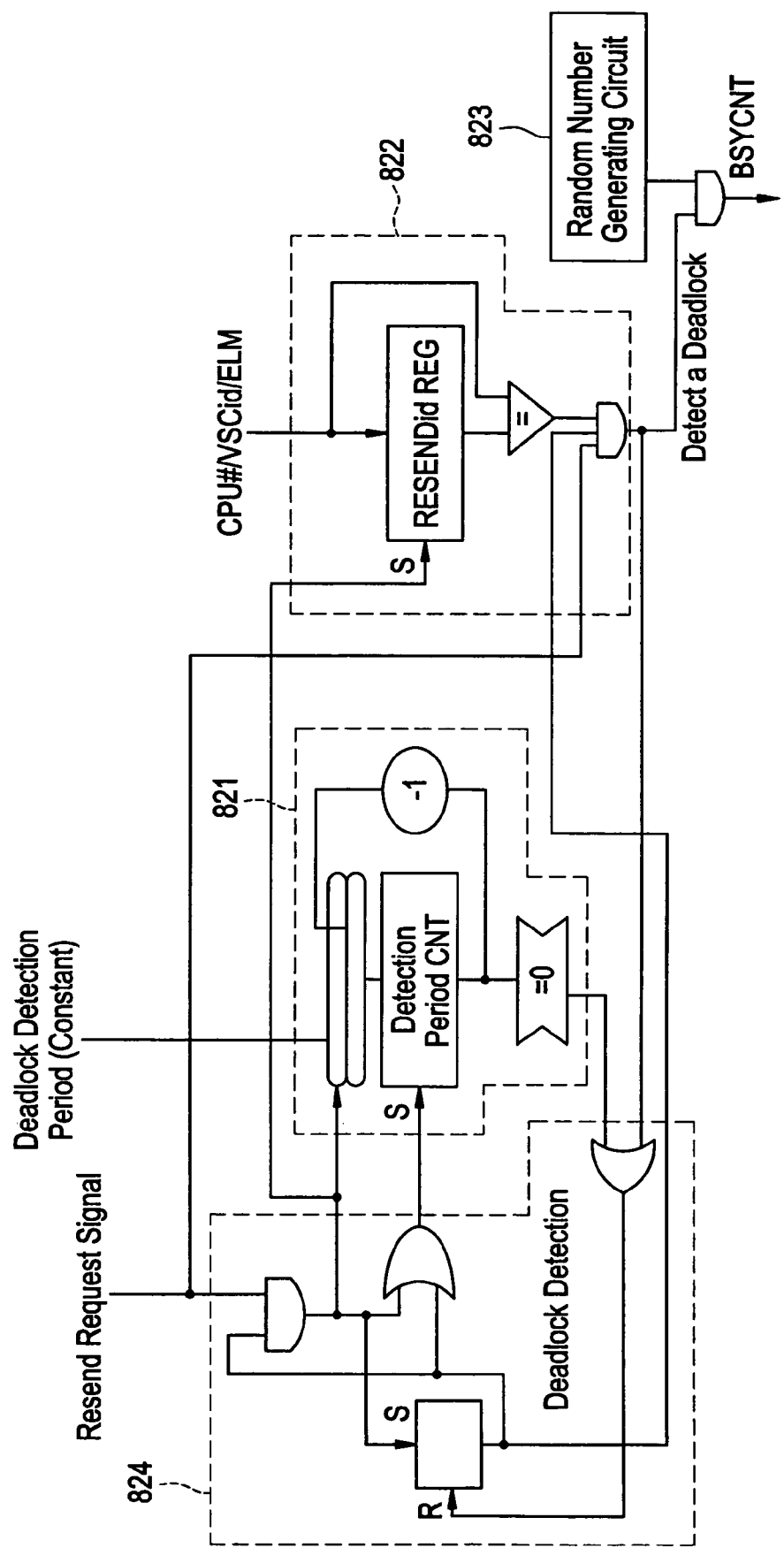
FIG. 8 is a block diagram of a deadlock detection controller in the main memory controller shown in FIG. 7.
Figure 9:
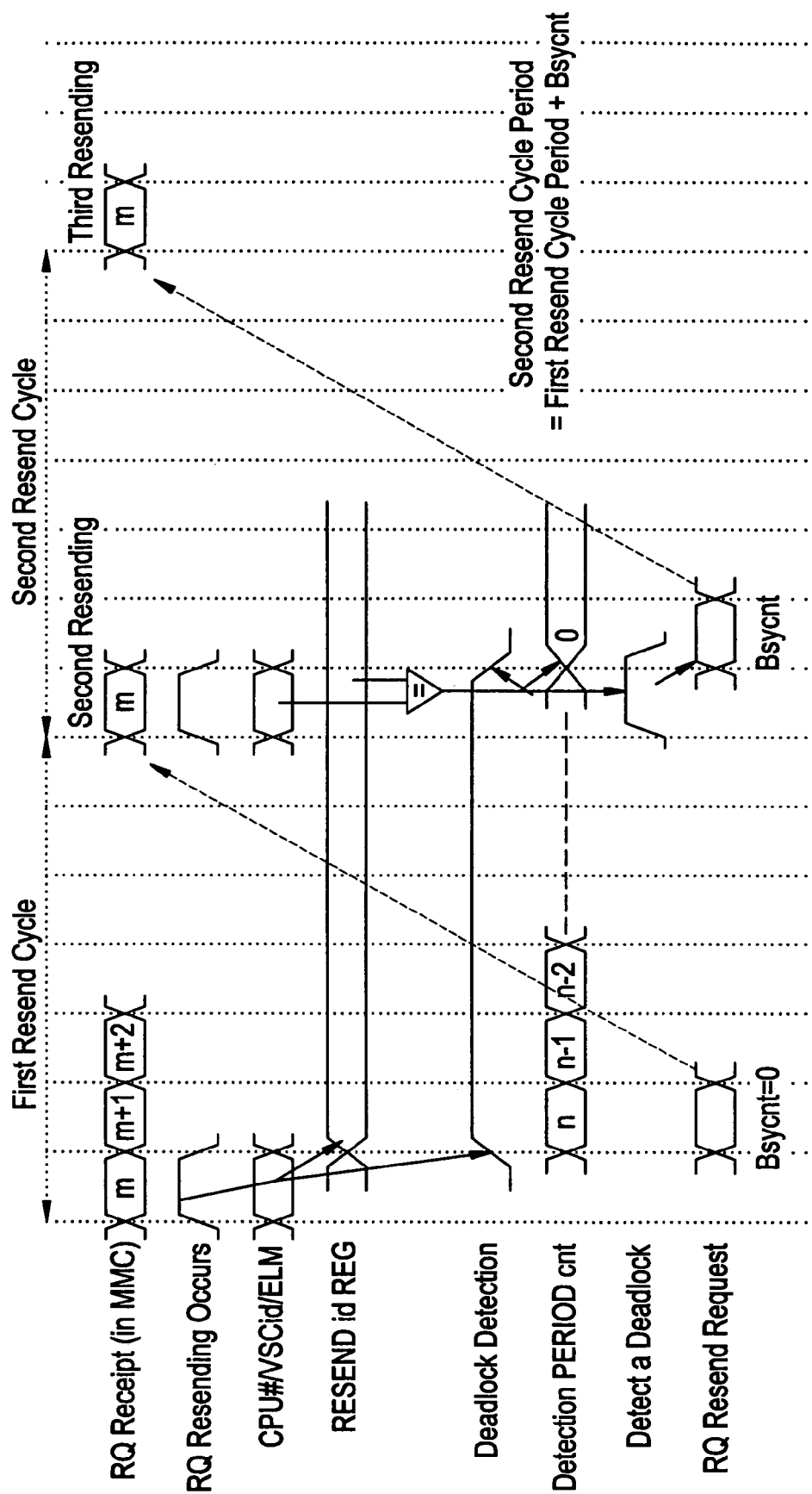
FIG. 9 is a diagram showing the manner in which the deadlock detection controller shown in FIG. 8 operates.

FIG. 6 shows in block form a CPU in an information processing apparatus according to a second embodiment of the present invention. FIG. 7 shows in block form a main memory controller in the information processing apparatus according to the second embodiment of the present invention. FIG. 8 shows in block form a deadlock detection controller in the main memory controller shown in FIG. 7. FIG. 9 shows the manner in which the deadlock detection controller shown in FIG. 8 operates.

In the first embodiment, a single VSC address buffer is associated with each of the master unit and the slave unit, and hence the MMC is required to have as many VSC address buffers as the number of master units and slave units.

According to the second embodiment, the MMC is arranged to hold storage addresses designated by element requests of the master unit and the slave unit in a single VSC address buffer. Accordingly, request information, storage addresses, and data sent from the master unit and the slave unit are commonly received by a single MMU input RQ register. The VSC address buffer according to the second embodiment is arranged to hold storage addresses corresponding to a plurality of VSC instructions.

With such an arrangement, since the VSC address buffer may possibly suffer a shortage of empty entries (overflow) that are required to hold storage addresses, an RQ resend request signal for resending elements corresponding to overflowed VSC instructions is sent from the MMC to the master unit and the slave unit.

The master unit and the slave unit according to the second embodiment have a retry buffer for holding request information, storage addresses and data corresponding to element requests which have already been issued. When the master unit and the slave unit receive an RQ resend request signal from the MMC, the master unit and the slave unit resend request information, storage addresses and data held by the retry buffer to the MMC. At this time, because element numbers that start to be resent may possibly differ between the master unit and the slave unit, the master unit and the slave unit start resending an element with a smaller element number, of elements to be resent. For example, if the master unit resends an element with a smaller element number, then the slave unit resends an element with an element number which is the element number+1 of the element resent by the master unit, and if the slave unit resends an element with a smaller element number, then the master unit resends an element with an element number which is the element number−1 of the element resent by the slave unit.

When the master unit and the slave unit according to the second embodiment receive an RQ resend request signal from the MMC, the master unit and the slave unit send a buffer clear signal to the MMC for clearing the content of the VSC address buffer which corresponds to an element request of a VSC instruction which has overflowed the VSC address buffer.

As shown in FIG. 6, master unit 5 according to the second embodiment comprises control retry buffer 56 for holding request information corresponding to an element request that has been issued, address/data retry buffer 57 for holding a storage address and data corresponding to the element request, and first selector 58 and second selector 59 for resending request information, a storage address and data to the MMC when an RQ resend request signal is received from the MMC.

Master-side RQ control circuit 52 sends request information corresponding to an element request that has been issued to control retry buffer 56 and first selector 58. When an RQ resend request signal is not received, first selector 58 sends request information received from master-side RQ control circuit 52 to PNU 54. When an RQ resend request signal is received, first selector 58 sends request information held by control retry buffer 56 to PNU 54. Similarly, vector register 53 sends a storage address and data designated by an element request to address/data retry buffer 57 and second selector 59. When an RQ resend request signal is not received, second selector 59 sends a storage address and data received from vector register 53 to PNU 54. When an RQ resend request signal is received, second selector 59 sends a storage address and data held by address/data retry buffer 57 to PNU 54.

When an RQ resend request signal is received from the MMC, master-side RQ control circuit 52 sends a start element number instruction for acquiring a start element number which represents the element number of an element that starts to be resent, to slave-side RQ control circuit 62 of slave unit 6. When a start element number instruction is received from master-side RQ control circuit 52, slave-side RQ control circuit 62 returns the start element number of an element that starts to be resent from slave unit 6 to master-side RQ control circuit 52 (start element number report). Master-side RQ control circuit 52 compares the start element number that starts to be resent from master unit 5 and the start element number received from slave-side RQ control circuit 62 with each other, and corrects the element number that starts to be resent based on a smaller one of the element numbers. If necessary, master-side RQ control circuit 52 sends the corrected element number that starts to be resent to slave-side RQ control circuit 62. Then, master-side RQ control circuit 52 sends a buffer clear signal via PNU 54 to the MMC for clearing the content of the VSC address buffer which corresponds to an element request of a VSC instruction issued thereby which has overflowed the VSC address buffer. PNU 54 sends a buffer clear signal to the MMC before resending of request information, storage addresses, and data to the MMC.

Slave unit 6 is identical in arrangement to master unit 5 except for different operations of master-side RQ control circuit 52 and slave-side RQ control circuit 62.

As shown in FIG. 7, MMU input RQ register 71 of MMC 7 according to the second embodiment comprises the MMU input RQ register of the MMC according to the first embodiment shown in FIG. 4, with a V2 field added thereto for receiving a buffer clear signal sent from the CPU.

VSC address buffer 72 according to the second embodiment is arranged to hold unit number CPU# and identifier VSCid for identifying a VSC instruction, in association with an element number (ELM) and a storage address (Address). In the present embodiment, in order to avoid a deadlock state to be described later on, the number of entries of VSC address buffer 72 is set to (the number of words simultaneously processed by master unit 5)+1 (257 words in the present embodiment).

MMC according to the second embodiment comprises the MMC according to the first embodiment shown in FIG. 4, with VSC address buffer controller 80, resend request register 81, and deadlock detection controller 82 added thereto.

When VSC address buffer controller 80 detects an overflow of VSC address buffer 72, VSC address buffer controller 80 sends a resent request signal for causing master unit 5 and slave unit 6 to resend corresponding request information, a storage address and data, to resend request register 81 and deadlock detection controller 82.

Deadlock detection controller 82 detects a deadlock state in which an overflow of VSC address buffer 72 and resending of elements from master unit 5 and slave unit 6 are repeatedly carried out. When such a deadlock state occurs, deadlock detection controller 82 sends a delay value (BSYCNT) to shift the timing to resend elements to resend request register 81.

When unit number CPU#, identifier VSCid, and element number ELM are transferred from MMU input RQ register 71 in synchronism with the issuance timing of an element request, and a resent request signal is received from VSC address buffer controller 80, resend request register 81 sends an RQ resend request signal to master unit 5 and slave unit 6 an issuing source of an element request which has overflowed VSC address buffer 72. At this time, resend request register 81 attaches a delay value BSYCNT received from deadlock detection controller 82 to the RQ resend request signal.

Comparing circuit 77 according to the second embodiment comprises the element number comparator and the address comparator according to the first embodiment, and additionally includes unit number comparator 771 for comparing unit numbers CPU# corresponding to a preceding element request and a following element request stored in VSC address buffer 72 with each other, and identifier comparator 772 for comparing identifiers VSCid corresponding to a preceding element request and a following element request stored in VSC address buffer 72 with each other.

The compared results of unit number comparator 771 and identifier comparator 772 are output via first AND gate 773 to second AND gate 791 of buffer controller 79. Second AND gate 791 outputs the result of logical AND of a buffer clear signal from the V2 field of MMU input RQ register 71 and an output signal from first AND gate 773.

When buffer control circuit 79 receives a buffer clear signal from master unit 5 or slave unit 6, buffer control circuit 79 clears entries in VSC address buffer 72 which agree with unit numbers CPU# and identifiers VSCid corresponding to a preceding element request and a following element request. Other structural and operational details of the information processing apparatus according to the second embodiment are the same as those of the information processing apparatus according to the first embodiment, and will not be described in detail below. In MMC 7 shown in FIG. 7, a request distributing circuit, a WE register, and an adr/data register are omitted from illustration.

The deadlock state referred to above will be described below.

If the CPU comprises single master unit 5 and single slave unit 6 and each of master unit 5 and slave unit 6 are arranged to simultaneously process 256 elements, then it is possible for master unit 5 to issue 256 element requests earlier than slave unit 6 due to a signal propagation delay and various issuance limitations on element requests. When all element requests are issued to the same MMC 7, if the number of entries of VSC address buffer 72 is 256, then all the entries of VSC address buffer 72 are used only to process element requests issued from master unit 5. Inasmuch as the processing of a first element request issued from slave unit 6 causes an overflow of VSC address buffer 72 in this state, VSC address buffer 72 sends an RQ resend request signal to master unit 5 and slave unit 6, which start resending elements from the first element. If master unit 5 issues 256 element requests again earlier than slave unit 6 at this time, an overflow of VSC address buffer 72 and the resending of elements from master unit 5 and slave unit 6 are repeatedly carried out, so that the VSC instructions will never be processed. Such a state is referred to as a deadlock.

In order to avoid a deadlock state, the number of entries of VSC address buffer 72 may be set to (the number of elements simultaneously processed by master unit 5)+1 (257 in the present embodiment).

If the CPU comprises a plurality of sets of master units 5 and slave units 6 and each of the master units 5 and slave units 6 simultaneously processes 256 elements, then master unit 5 in each set may possibly issue 256 element requests earlier than slave unit 6. Therefore, if the number of entries of VSC address buffer 72 is smaller than (the number of elements simultaneously processed by master unit 5)×(the number of sets of master units 1 and slave units 2), then there is a possibility of a deadlock state in which an overflow of VSC address buffer 72 and resending of elements from master unit 5 and slave unit 6 are repeated (hereinafter referred to as resend cycle).

To avoid the deadlock state, the number of entries of VSC address buffer 72 may be set to (the number of elements simultaneously processed by master unit 5)×(the number of sets of master units 5 and slave units 6)+1.

However, increasing the number of entries of VSC address buffer 72 just for the purpose of avoiding a deadlock state which hardly occurs actually invites an increase in hardware, and hence results in a new problem in that the cost of the MMU rises.

According to the present embodiment, MMC 7 has deadlock detection controller 82 shown in FIG. 7 for avoiding a deadlock state while suppressing an increase in hardware.

When the same element number corresponding to the same VCS instruction is resent from same master unit 5 and slave unit 6 within a predetermined period, deadlock detection controller 82 delays the issuance timing of an element request from master unit 5 and slave unit 6 at the time the element number is resent for the second time, thus disturbing the resend cycle of the element request thereby to get out of the deadlock.

As shown in FIG. 8, deadlock detection controller 82 comprises counter circuit 821 for measuring a deadlock detection period in which to detect whether a deadlock state has occurred or not, deadlock judging circuit 822 for comparing unit number CPU#, identifier VSCid, and element number ELM corresponding to a storage address and data that have been resent with respective preceding values thereof, and judging that a deadlock state has occurred if all unit number CPU#, identifier VSCid, and element number ELM agree with the preceding values, random number generating circuit 823 for generating a delay value BSYCNT to shift the timing to issue an element request from master unit 5 and slave unit 6 when it is to be resent, and detection period control circuit 824 for controlling operation of counter circuit 821 and deadlock judging circuit 822.

Counter circuit 821 has a selector, a register (detection period cnt), a subtractor (−1), and a comparator (=0). When counter circuit 821 starts counting, it reads the value (constant) of a deadlock detection period signal supplied from an external circuit in detection period cnt, starts counting (decrement) from the read value, and outputs its resultant count to detection period control circuit 824 when a count value=0 is detected.

Deadlock judging circuit 822 has a resend id register (REG) and a comparator (=). Deadlock judging circuit 822 holds CPU#/VSCid/ELM transferred from MMU input RQ register 71 in the resend id REG when an element is resent, compares CPU#/VSCid/ELM transferred when an element is resent next time with the values held by the resend idREG, and makes the deadlock detection signal active when all the CPU#/VSCid/ELM agree with the values held by the resend idREG.

Detection period control circuit 824 has a latch circuit, an OR gate, and an AND gate. If deadlock judging circuit 822 detects that all the CPU#/VSCid/ELM agree with the values held by the resend idREG, detection period control circuit 824 causes counter circuit 821 to start counting. When the counting is finished, i.e., when the deadlock detection period is finished, or the deadlock detection signal is rendered active, detection period control circuit 824 resets the detection period cnt of counter circuit 821 or resets the resend idREG of deadlock judging circuit 822.

With the above arrangement, as shown in FIG. 9, when an overflow of VSC address buffer 72 occurs due to an element request issued from any set of master unit 5 and slave unit 6 and a resending of an element (RQ resending) occurs, detection period control circuit 824 makes the deadlock detection signal active, and causes counter circuit 821 to start counting, thereby starting a process of detecting a deadlock. The process of detecting a deadlock is put to an end when the output value of counter 821 in detection period cnt becomes 0.

The length of the deadlock detection period is set to the longest value (constant) of the period of a resend cycle generated by one set of master unit 5 and slave unit 6, and the set value is stored in a ROM (not shown) of the information processing apparatus. When the information processing apparatus is turned on, the stored value is supplied as a deadlock detection period signal from the ROM to counter circuit 821.

Deadlock judging circuit 822 stores unit number CPU#, identifier VSCid, and element number ELM corresponding to an element request which has been resent when a deadlock detecting period is started, in the resend idREG. Deadlock judging circuit 822 compares unit number CPU#, identifier VSCid, and element number ELM at the time the element request is resent for the second time, with the values stored in the resend idREG, and judges that a deadlock state has occurred (detects a deadlock) when all unit number CPU#, identifier VSCid, and element number ELM agree with the values.

At this time, a deadlock detection signal which is the output signal from deadlock judging circuit 822 becomes active, and a delay value BSYCNT generated by random number generating circuit 823 is stored in resend request register 81. Resend request register 81 attaches the delay value BSYCNT to the RQ resend request signal, and sends it to master unit 5 and slave unit 6 (RQ resend request). At the same time, detection period control circuit 824 resets the deadlock detection signal, ending the deadlock detecting process.

Master-side RQ control circuit 52 of master unit 5 and slave-side RQ control circuit 62 of slave unit 6, which have received the RQ resend request signal, shifts the issuance timing of an element request by the delay value BSYCNT, and resend a designated element.

By carrying out the above process, the second resend cycle is made longer than the first resend cycle, disturbing the repetitive period of resend cycles to get out of the deadlock state.

Since the above process of avoiding a deadlock is a process of disturbing the period of resend cycles generated between a plurality of sets of master units 5 and slave units 6, the process fails to avoid a deadlock state that occurs if the CPU comprises single master unit 5 and single slave unit 6. Consequently, the number of entries of VSC address buffer 72 should preferably be set to at least (the number of elements simultaneously processed by master unit 5)+1.

The information processing apparatus according to the present embodiment is capable of using VSC address buffer 72 efficiently. Therefore, the number of VSC address buffers 72 that are used can be reduced, thereby reducing the cost of MMU 7.

While preferred embodiments of the present invention have been described using specific terms, such description is for illustrative purposes only, and it is to be understood that changes and variations may be made without departing from the spirit or scope of the following claims.

What is claimed is:

1. A vector information processing apparatus comprising:
   a CPU comprising a plurality of asynchronously operating units;
   a main memory for storing data; and
   a main memory controller for controlling the writing of data in said main memory, said main memory controller including a vector scatter (VSC) address buffer that holds a storage address in said main memory for each element designated by a vector scatter instruction, wherein said main memory controller inhibits the outputting of a writing permission signal that permits writing to said main memory which is generated according to a writing request that requests writing of an element having a smaller element number than at least one other element designated by the vector scatter instruction if the writing request instructs storage of said element at an identical storage address as said at least one other element and the writing request has not been processed in accordance with a sequence of element numbers defined by the vector scatter instruction,
   wherein writing requests for writing said element and said at least one other element to said storage address in said main memory are issued respectively from said asynchronously operating units of said CPU according to said vector scatter instruction.

2. The information processing apparatus according to claim 1, wherein said main memory controller has a plurality of VSC address buffers corresponding respectively to said asynchronously operating units.

3. The information processing apparatus according to claim 2, wherein said asynchronously operating units impart one identifier to a plurality of said writing requests issued according to a single vector scatter instruction, and said main memory controller clears the contents of said VSC address buffers if an identifier of a preceding writing request and an identifier of a following writing request do not agree with each other.

4. The information processing apparatus according to claim 1, wherein said main memory controller comprises:
   a VSC address buffer controller for controlling said VSC address buffer to hold said storage address sent from said asynchronously operating units and, if an overflow condition occurs in said VSC address buffer, requests the asynchronously operating unit which has issued a vector scatter instruction that has caused said overflow to resend said element; and
   wherein said asynchronously operating unit has a retry buffer for holding each element designated by said vector scatter instruction issued thereby, and resends an element held by said retry buffer to said main memory controller if requested by said main memory controller to resend said element.

5. The information processing apparatus according to claim 4, wherein said asynchronously operating unit corrects the element number of an element which starts to be resent based on a smallest element number, of the elements which start to be resent by each asynchronously operating unit.

6. The information processing apparatus according to claim 4, wherein if said main memory controller detects a deadlock state in which an overflow of said VSC address buffer and a resending of an element from said asynchronously operating unit are repeated, said main memory controller sends a delay value for shifting the timing to resend the element from said asynchronously operating unit to said asynchronously operating unit; and
   wherein said asynchronously operating unit delays the timing to resend the element by said delay value received from said main memory controller.

7. The information processing apparatus according to claim 5, wherein if said main memory controller detects a deadlock state in which an overflow of said VSC address buffer and a resending of an element from said asynchronously operating unit are repeated, said main memory controller sends a delay value for shifting the timing to resend the element from said asynchronously operating unit to said asynchronously operating unit; and
   wherein said asynchronously operating unit delays the timing to resend the element by said delay value received from said main memory controller.

8. The information processing apparatus according to claim 4, wherein the number of storage addresses held by said VSC address buffer is set to at least (the number of elements simultaneously processed by said asynchronously operating unit)+1.

9. The information processing apparatus according to claim 5, wherein the number of storage addresses held by said VSC address buffer is set to at least (the number of elements simultaneously processed by said asynchronously operating unit)+1.

10. The information processing apparatus according to claim 6, wherein the number of storage addresses held by said VSC address buffer is set to at least (the number of elements simultaneously processed by said asynchronously operating unit)+1.

11. A method of controlling a memory of a vector information processing apparatus having a CPU comprising a plurality of asynchronously operating units, a main memory for storing data, and a main memory controller for controlling the writing of data in said main memory, said main memory controller includes a vector scatter (VSC) address buffer that holds a storage address in said main memory for each element designated by a vector scatter instruction, said method comprising the step of:
   inhibiting the outputting of a writing permission signal that permits writing to said main memory which is generated according to a writing request that requests writing of an element having a smaller element number than at least one other element designated by the vector scatter instruction if the writing request instructs storage of said element at an identical storage address as said at least one other element and the writing request has not been processed in accordance with a sequence of element numbers defined by the vector scatter instruction,
   wherein writing requests for writing said element and said at least one other element to said storage address in said main memory are issued respectively from said asynchronously operating units of said CPU according to said vector scatter instruction.

12. The method of controlling a memory according to claim 11, further comprising the step of:
   holding only storage addresses for a plurality of elements designated by a single vector scatter instruction, in said VSC address buffer.

13. The method of controlling a memory according to claim 11, further comprising the steps of:
   imparting one identifier to said writing requests issued according to a single vector scatter instruction; and
   clearing the content of said VSC address buffer if an identifier of a preceding writing request and an identifier of a following writing request do not agree with each other.

14. The method of controlling a memory according to claim 12, further comprising the steps of:
   imparting one identifier to said writing requests issued according to a single vector scatter instruction; and
   clearing the content of said VSC address buffer if an identifier of a preceding writing request and an identifier of a following writing request do not agree with each other.

15. The method of controlling a memory according to claim 11, further comprising the steps of:
   controlling said VSC address buffer to hold said storage address sent from a plurality of said asynchronously operating units;
   if an overflow condition occurs in said VSC address buffer, requesting the asynchronously operating unit which has issued a vector scatter instruction that has caused said overflow to resend said element; and
   holding each element designated by said vector scatter instruction in said asynchronously operating unit, and resending an element held by a retry buffer to said main memory controller if requested to resend said element.

16. The method of controlling a memory according to claim 15, further comprising the step of:
   correcting the element number of an element which starts to be resent based on a smallest element number, of the elements which start to be resent by each asynchronously operating unit.

17. The method of controlling a memory according to claim 15, further comprising the step of:

if a deadlock state in which an overflow of said VSC address buffer and a resending of an element from said asynchronously operating unit are repeated is detected, sending a delay value for shifting the timing to resend the element from said asynchronously operating unit from said main memory controller to said asynchronously operating unit;

wherein said asynchronously operating unit delays the timing to resend the element by said delay value received from said main memory controller.

18. The method of controlling a memory according to claim 16, further comprising the step of:

if a deadlock state in which an overflow of said VSC address buffer and a resending of an element from said asynchronously operating unit are repeated is detected, sending a delay value for shifting the timing to resend the element from said asynchronously operating unit from said main memory controller to said asynchronously operating unit;

wherein said asynchronously operating unit delays the timing to resend the element by said delay value received from said main memory controller.

19. The information processing apparatus according to claim 1, wherein writing requests for writing said element and said at least one other element to said storage address in said main memory are issued respectively from different asynchronously operating units of said CPU according to said vector scatter instruction.

20. The method of controlling a memory according to claim 11, wherein writing requests for writing said element and said at least one other element to said storage address in said main memory are issued respectively from different asynchronously operating units of said CPU according to said vector scatter instruction.

* * * * *